United States Patent [19]

Miller

[11] Patent Number: 4,641,025
[45] Date of Patent: Feb. 3, 1987

[54] SYSTEM FOR DETERMINING THE POSITION OF THE BOUNDARY BETWEEN SUBSTANCES HAVING DIFFERENT REFRACTIVE INDICES

[75] Inventor: Glen E. Miller, Redondo, Wash.

[73] Assignee: The Boeing Company, Seattle, Wash.

[21] Appl. No.: 678,294

[22] Filed: Dec. 5, 1984

[51] Int. Cl.⁴ .............................................. H03J 5/16
[52] U.S. Cl. ....................... 250/227; 250/577; 455/612
[58] Field of Search ............ 73/293; 250/227, 577; 455/610, 612

[56] References Cited

U.S. PATENT DOCUMENTS

| | | | |
|---|---|---|---|
| 2,240,988 | 5/1941 | Hertel | 250/227 |
| 2,350,712 | 6/1944 | Barsties | 250/227 |
| 3,120,125 | 2/1964 | Vasel | 250/227 |
| 3,389,950 | 6/1968 | Harper | 250/227 |
| 3,417,730 | 12/1968 | Colley et al. | 250/227 |
| 3,517,639 | 6/1970 | Whitsel | 250/227 |
| 3,570,311 | 3/1971 | Nelson | 250/227 |
| 4,242,590 | 12/1980 | von Tlück | 250/577 |
| 4,246,489 | 1/1981 | Yoshida et al. | 250/577 |
| 4,274,705 | 6/1981 | Miller | 250/227 |
| 4,287,427 | 9/1981 | Scifres | 250/227 |
| 4,353,252 | 10/1982 | Jeans | 250/227 |
| 4,356,395 | 10/1982 | Miller | 250/227 |
| 4,506,153 | 3/1985 | Ohno | 250/227 |

*Primary Examiner*—Eugene R. LaRoche
*Assistant Examiner*—Steven J. Mottola
*Attorney, Agent, or Firm*—Christensen, O'Connor, Johnson & Kindness

[57] ABSTRACT

A device for determining the position of the boundary between first and second substances having different refractive indices that may be used to determine the level or volume of liquid in a container. The apparatus comprises a plurality of optical sensors (21–26), a pulse source (30) for generating an optical source pulse, an interface (40) responsive to the source pulse for producing an optical response pulse, and a receiver (60) for measuring the duration of the response pulse. The sensors are positioned along a line that intersects the boundary (16) between the first (18) and second (12) substances over a range of boundary positions. Each sensor is adapted to vary one of its optical properties depending upon whether it is in the first or second substance. The interface produces the response pulse such that the response pulse has a time duration proportional to the number of sensors that are in the first substance. The length of the response pulse therefore determines the number of sensors in the first substance and the position of the boundary.

13 Claims, 5 Drawing Figures

SYSTEM FOR DETERMINING THE POSITION OF THE BOUNDARY BETWEEN SUBSTANCES HAVING DIFFERENT REFRACTIVE INDICES

FIELD OF THE INVENTION

The present invention relates to a system for measuring the position of the boundary between substances having different refractive indices and, in particular, to a system for measuring the level of a liquid within a container.

BACKGROUND OF THE INVENTION

Both electromechanical and optical systems have been used in the past to measure the level of liquid in a container, e.g., the level of fuel in an aircraft fuel tank. Optical based systems possess a number of significant advantages for avionics and military applications, including EMI and EMP immunity, resistance to gamma and neutron radiation, resistance to temperature extremes, and resistance to corrosive fuels and other substances.

SUMMARY OF THE INVENTION

The present invention provides an improved optical system for determining the position of the boundary between first and second substances having different refractive indices.

In one preferred embodiment, the apparatus of the present invention comprises a plurality of N optical sensors, source means for generating an optical source pulse, interface means responsive to the source pulse for producing an optical response pulse, and means for measuring the duration of the response pulse. The sensors are positioned along a line that intersects the boundary between the first and second substances over a range of boundary positions. Each sensor is adapted to vary one of its optical properties depending on whether it is in the first or second substance. The interface means produces the response pulse such that the response pulse has a time duration proportional to the number of sensors that are in the first substance. The length of the response pulse therefore determines the number of sensors in the first substance and the position of the boundary. The second substance may comprise liquid in a container, and the apparatus may further comprise means responsive to the duration of the response pulse for indicating the level of liquid in the container.

In another aspect, each sensor of the present invention is adapted to receive an optical input pulse, and to produce a corresponding optical output pulse if the sensor is in the first substance, and to produce no corresponding output pulse if the sensor is in the second substance. The interface means includes power splitter means for dividing the source pulse into N input pulses, power combiner means for combining output pulses into a single optical response signal that comprises the response pulse, and fiber optic means. The fiber optic means conveys one input pulse from the power splitter means to each sensor, and conveys output pulses from the sensors to the power combiner means, such that each sensor has associated with it a delay time between the production of an input pulse by the power splitter means and the arrival of a resulting output pulse at the power combiner means. The delay time associated with each sensor is greater by a fixed increment than the delay time associated with the adjacent sensor in one direction along the line of sensors. The fixed increment is preferably about equal to the duration of each output pulse. The power splitter and power combiner means may comprise a single junction means.

In a further aspect, the present invention comprises a method for determining the position of the boundary between first and second substances having different refractive indices. The method comprises positioning a plurality of N optical sensors along the line that intersects the boundary over a range of boundary positions, generating an optical source pulse, and dividing the source pulse into N input pulses and conveying one input pulse to each sensor. Each sensor is adapted to receive an input pulse, and to produce a corresponding optical output pulse if the sensor is in the first substance and to produce no corresponding output pulse if the sensor is in the second substance. The method further comprises combining the output pulses into a response pulse such that the length of the response pulse is a function of the number of sensors that produce output pulses, and measuring the duration of the response pulse.

The system of the present invention possesses a number of advantages over other systems that use similar arrays of sensors. In the apparatus of the present invention, the electronic circuitry, e.g., the means for measuring the duration of the response pulse, can be made extremely simple. This simplicity results in higher reliability for the system. Furthermore, in the present system, the boundary position information is contained in the time domain, and the system is therefore highly tolerant of path loss variations and other factors which tend to degrade the signal amplitude.

DETAILED DESCRIPTION OF THE INVENTION

Figure 1:
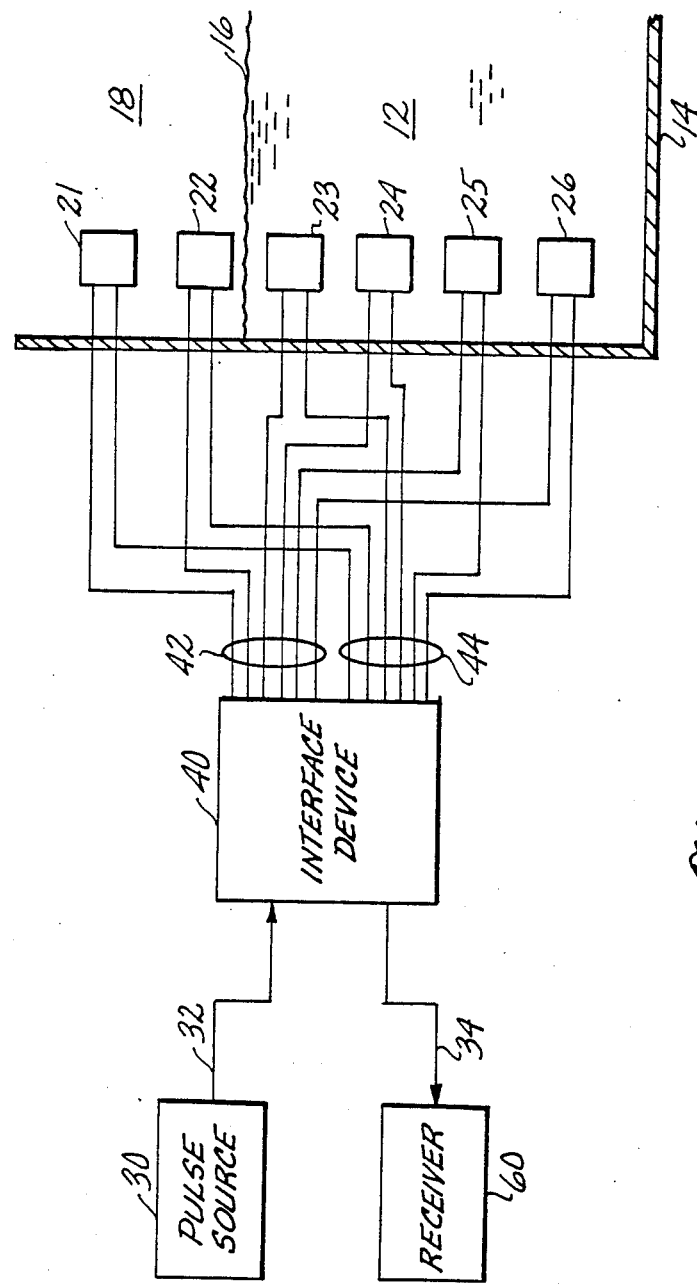
FIG. 1 is a block diagram of a system according to the present invention for measuring the level of a liquid in a container.

FIG. 1 illustrates one preferred embodiment of the present invention adapted to measure the level or volume of liquid 12 in container 14. The system comprises a plurality of sensors 21-26, pulse source 30, interface device 40 and receiver 60. Sensors 21-26 are positioned along a line or axis that intersects the surface 16 of liquid 12. Six sensors are shown in FIG. 1 only by way of example. In practice, the number of sensors are determined by the resolution required of the system. Periodically or upon command, pulse source 30 produces a short duration (e.g., one nanosecond) optical source pulse, and sends the source pulse to interface circuit 40 over fiber optic cable 32. The term "optical" is used herein to refer to phenomena relating to electromagnetic radiation that can be transmitted through a fiber optic cable, for example infrared and visible radiation. Pulse source 30 may comprise a laser diode driven by a circuit that includes a pulse forming network and a high speed switch such as an avalanche transistor.

Interface circuit 40 splits the source pulse into a plurality of approximately equal power input pulses, and sends the input pulses to sensors 21-26 through fiber optic cables 42. Each sensor is adapted to respond to an input pulse by producing an output pulse if and only if the sensor is immersed in a medium having a refractive index less than a predetermined limit. In the embodiment of FIG. 1, such limit is selected to have an intermediate value between the refractive index of liquid 12 and the refractive index of air 18 or other gas above liquid 12. Therefore in response to a set of input pulses generated by interface circuit 40 in response to a given source pulse, only sensors 21 and 22 will produce output pulses when surface 16 is positioned as shown in FIG. 1.

The output pulses produced by the sensors are sent to interface circuit 40 over fiber optic cables 44. The interface circuit combines all output pulses resulting from one source pulse into a single response pulse, and sends the response pulse to receiver 60 over fiber optic cable 34. As detailed below, the time duration of the response pulse corresponds to the number of sensors that produce output pulses, i.e., to the number of sensors above surface 16. Receiver 60 measures the length of the response pulse, and thereby determines the position of surface 16 with respect to sensors 21-26.

The apparatus of the present invention can be employed in any application wherein it is desired to measure the position of a boundary between first and second substances having different refractive indices. The sensors are positioned along a line that intersects the boundary over a range of boundary positions, and each sensor is adapted to produce an output pulse in response to an input pulse only when the sensor is immersed in the first substance. A preferred device for sensors 21-26 is the sensor disclosed in U.S. Pat. No. 4,274,705. In the sensor described in that patent, two fiber optic cables are connected to a transparent, hemiellipsoidal optical element. An input pulse entering the optical element through one fiber optic cable will be internally reflected, to produce an output pulse exiting through the other fiber optic cable, whenever the optical element is immersed in a medium having a refractive index less than a predetermined limit.

Figure 2:
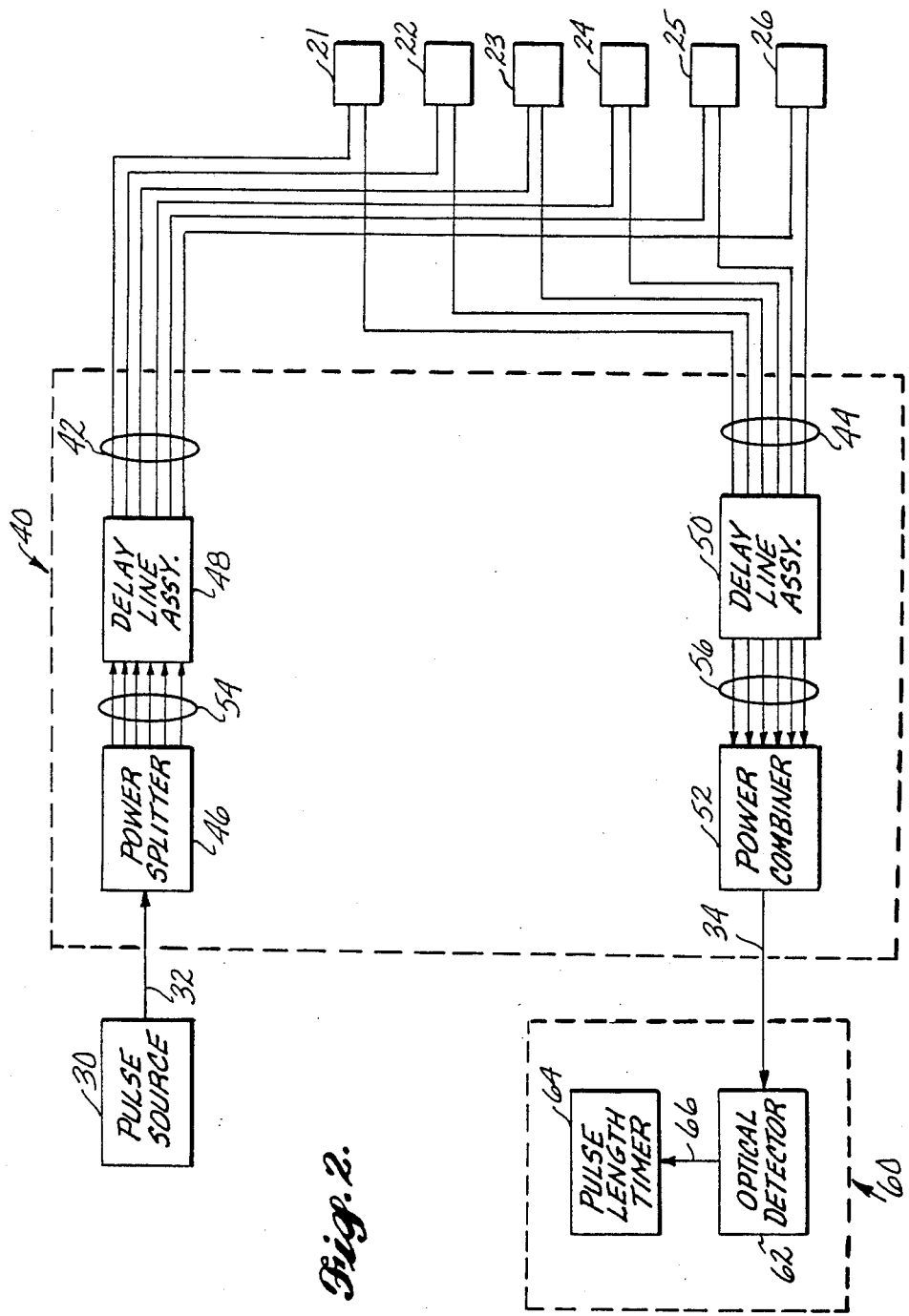
FIG. 2 is a more detailed block diagram of the system of FIG. 1.
Figure 3:
FIG. 3 is a timing diagram for the optical signals produced by the system of FIG. 2.

Referring now to FIGS. 2 and 3, interface device 40 comprises power splitter 46, delay line assembly 48, delay line assembly 50 and power combiner 52. Power splitter 46 receives a source pulse from fiber optic cable 32 and splits or divides the source pulse approximately equally between a plurality of fiber optic cables 54, the resulting pulse on each of fiber optic cables 54 being herein referred to as an input pulse. The input pulses are then passed through delay line assembly 48, and are then conveyed to sensors 21-26 through fiber optic cables 42. In a preferred embodiment, delay line assembly 48 comprises a plurality of fiber optic delay lines connecting each of fiber optic cables 54 to a corresponding one of fiber optic cables 42. In practice, each fiber optic cable 54 may comprise a portion of a continuous fiber optic cable that includes the associated delay line and the associated one of fiber optic cables 42. Each delay line delays the input pulse travelling through it by a time equal to the length of the delay line divided by the speed of light through the delay line. Therefore, for delay line material having a given, fixed light transmission speed, the delay produced by each delay line can conveniently be adjusted by adjusting the length of that delay line.

The output pulses produced by sensors 21-26 on fiber optic cables 44 are input to delay line assembly 50. Delay line assembly 50 is preferably similar to delay line assembly 48, and comprises a plurality of delay lines that connect each of fiber optic cables 44 to a corresponding one of fiber optic cables 56. Power combiner 52 receives output pulses from fiber optic cables 56, and sums or combines the output pulses to produce a single response pulse on fiber optic cable 34. The response pulse is transmitted to receiver 60 that comprises optical detector 62 and pulse length timer 64. Optical detector 62 produces an electrical pulse on line 66 that is the electrical analog of the optical response pulse received on fiber optic cable 34. Pulse length timer 64 measures the length of the pulse on line 66, and produces an indication of the level or volume of liquid in the tank.

The time delays produced by delay line assemblies 48 and 50 are selected such that the output pulse received by power combiner 52 from a particular sensor is delayed with respect to the arrival of a source pulse at the power splitter by an amount that is unique to that sensor and that bears a preestablished relationship to the delays associated with the output pulses from the other sensors. These output pulse delays are discussed in greater detail below. The amount by which a given output pulse is delayed may be selected by proportioning the required delay in any convenient manner between delay line assembly 48 and delay line assembly 50, even to the point of eliminating either one of the delay line assemblies and producing all of the required delays by the remaining assembly. In determining the lengths of the delay lines, the delays associated with fiber optic cables 42, 44, 54 and 56 and sensors 21-26 must be taken into account.

Suitable materials for fiber optic cables 42, 44, 54, and 56 and for the fiber optic delay lines are low loss, high bandwidth communication cables, such as those manufactured by Corning Glassworks. Such fiber optic cables typically produce delays on the order of 5 nanoseconds per meter with an attenuation of less than 0.01 db per meter. Because fiber optic cables of this type typically have diameters less than 0.005 inches, very significant delays can be achieved within a relatively small volume by winding the fiber optic cables around a spool or around portions of the sensor housing or similar structures.

In practice, power splitter 46 may simply comprise a junction between fiber optic cable 32 and fiber optic cables 54. To employ such a power splitter, the diameter of fiber optic cable 32 is selected to be larger than the diameter of fiber optic cables 54, and the ends of fiber optic cables 54 are packed together into a bundle and the bundle is positioned adjacent and fused to the end of fiber optic cable 32, such that a portion of the light exiting from the end of fiber optic cable 32 enters each of fiber optic cables 54. The diameters of fiber optic cables 54 are preferably identical to one another, and fiber optic cables 54 are preferably positioned so as to receive equal amounts of power from fiber optic cable 32. Power combiner 52 may comprise an identical junction between fiber optic cables 56 and fiber optic cable 34, such that each of the output pulses on fiber optic cables 56 are transmitted equally to the fiber optic cable 34.

FIG. 3 illustrates the relationship between the level of liquid 12 (FIG. 1) and the length of the response pulse on fiber optic cable 34. FIG. 3A shows one input pulse 68 produced by interface circuit 40 on one of fiber optic cables 54 in response to the arrival of a source pulse at the power splitter. The input pulses on the other ones of fiber optic cables 54 are preferably identical to input pulse 68. FIGS. 3B–3G represent the output pulses that would be received by power combiner 52 on fiber optic cables 56 if all sensors produced an output pulse, i.e., if the level of liquid 12 was below that of sensor 26. The length of the delay lines in delay line assemblies 48 and 50 are adjusted such that the output pulse from each sensor is received at power combiner 52 a fixed incremental delay time (T) after the output pulse from the sensor immediately above it. Furthermore, the length of incremental delay time T is chosen to be less than or equal to, and preferably approximately equal to, the length of each input and output pulse. As the level of surface 16 of liquid 12 varies within tank 14, the sensors that produce an output pulse for a given set of input pulses will always comprise a physically contiguous group of sensors. As a result, the output pulses will be physically contiguous to one another in time, and will therefore be combined by power combiner 52 to form a single response pulse 58 (FIG. 3A) on fiber optic cable 34. The length of response pulse 58 will therefore correspond to the number of sensors that produce an output pulse, i.e., to the number of sensors above surface 16 of liquid 12. In the example illustrated in FIG. 3, all sensors produce an output pulse, and the length of response pulse 58 is 6T.

Figure 4:
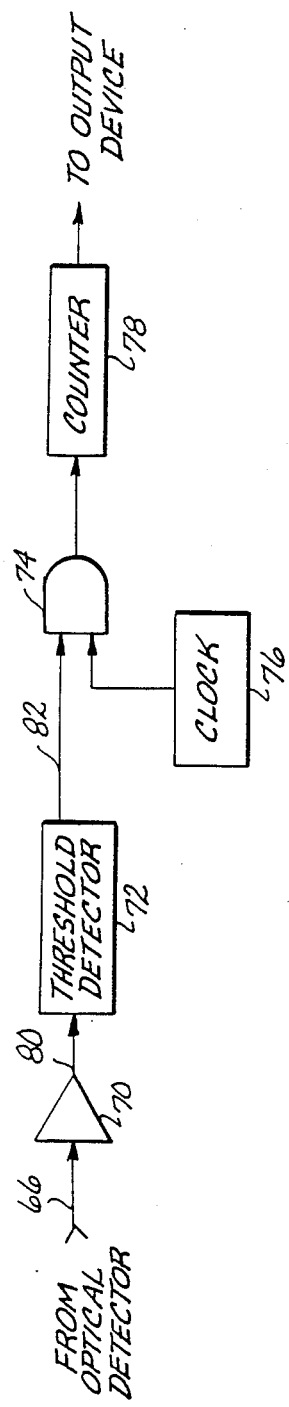
FIG. 4 is a block diagram of the pulse length timer of the system of FIG. 2.

One preferred embodiment for pulse length timer 64 is illustrated in FIG. 4. The pulse length timer comprises amplifier 70, threshold detector 72, gate 74, clock 76 and counter 78. Amplifier 70 amplifies the electrical pulse on line 66 to produce an amplified pulse that is input to threshold detector 72. Threshold detector 72 produces an output signal on line 82 whenever the amplified pulse signal on line 80 exceeds a preestablished threshold. During the interval that the preestablished threshold is exceeded, i.e., during the duration of response pulse 58, the signal on line 82 holds gate 74 open, such that clock pulses from clock 76 pass through gate 74 to counter 78. At the end of a response pulse, the count in counter 78 therefore corresponds to the length of the response pulse in units of clock cycles. The contents of counter 78 may then be transferred to a suitable output device to produce an indication of the level or volume of liquid in tank 14. When the counter contents are transferred, the counter may then be reset in preparation for timing the length of the next response pulse. The frequency of the signal generated by clock 76 can be adjusted such that the count in counter 78 directly corresponds to selected units of measure, such as gallons or cubic feet. In another embodiment, an average-reading device such as a D'Arsonval meter can be connected to the line 82, such that the average reading device responds directly to the duty cycle variations on line 82 to provide an analog indication of liquid volume or depth.

Figure 5:
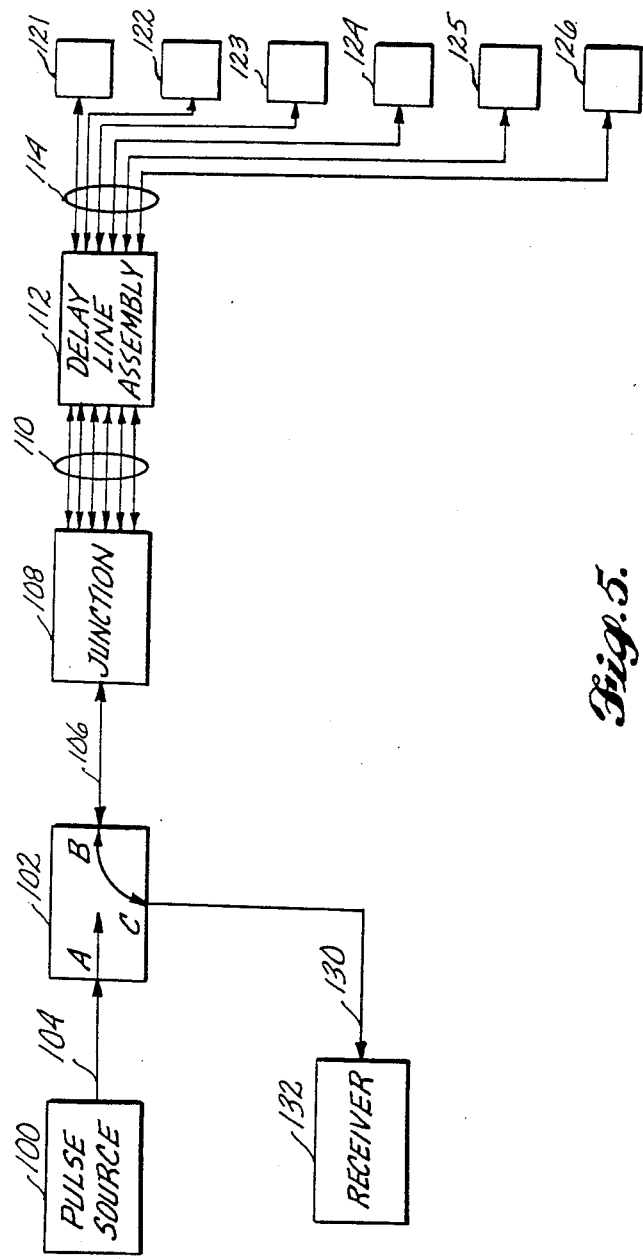
FIG. 5 is a block diagram of an alternate embodiment of the system of FIG. 2.

An alternative embodiment of the invention is set forth in FIG. 5. The embodiment of FIG. 5 comprises pulse source 100, bidirectional coupler 102, junction 108, delay line assembly 112, sensors 121–126 and receiver 132. Pulse source 100, sensors 121–126 and receiver 132 may be similar or identical to the corresponding components of the embodiment of FIGS. 1–2. Junction 108 may be constructed in a manner similar to that of power splitter 46 and power combiner 52 of the apparatus of FIG. 2. Delay line assembly 112 may be identical to either delay line assembly 48 or 50 of FIG. 2. Pulse source 100 produces an optical source pulse on fiber optic cable 104, the source pulse being received at port A of bidirectional coupler 102. The bidirectional coupler is adapted to pass the source pulse from port A to port B with little or no coupling to port C. The source pulse therefore exits the bidirectional coupler at port B and travels through fiber optic cable 106 to junction 108. Junction 108 divides the source pulse into a plurality of input pulses on fiber optic cables 110. Each of the input pulses passes through a delay line of delay line assembly 112 and through a corresponding one of fiber optic cables 114 to one of sensors 121–126. Each sensor is adapted to receive an input pulse and to produce an output pulse through the same sensor port. The output pulses are therefore produced on fiber optic cables 114. The output pulses pass through delay line assembly 112 and fiber optic cables 110, and are combined by junction 108 into a single response pulse on fiber optic cable 106. Bidirectional coupler 102 couples the response pulse from port B to port C, with little or no coupling to port A. The response pulse is therefore conveyed to receiver 132 via fiber optic cable 130. The delays produced by delay line assembly 112 are adjusted, as described above in connection with FIGS. 2–3, such that the length of the response pulse is proportional to the number of sensors that produce output pulses.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. An apparatus for determining the position of the boundary between first and second substances having different refractive indices, comprising:
a plurality of N optical sensors positionable along a line that intersects the boundary over a range of boundary positions, each sensor being adapted to vary one of its optical properties depending on whether it is in the first or second substance;
source means for generating an optical source pulse;
interface means responsive to the source pulse for producing an optical response pulse having a time duration proportional to the number of sensors that are in the first substance; and
means for measuring the duration of the response pulse.

2. The apparatus of claim 1, wherein the second substance is a liquid in a container and the first substance is a gas above the surface of the liquid, and wherein the apparatus further comprises means responsive to the duration of the response pulse for indicating the level of the liquid in the container.

3. The apparatus of claim 1, wherein each sensor is adapted to receive an optical input pulse, and to produce a corresponding optical output pulse if the sensor is in the first substance and to produce no corresponding output pulse if the sensor is in the second substance.

4. The apparatus of claim 3, wherein the interface means includes power splitter means for dividing the source pulse into N input pulses, power combiner means for combining output pulses into a single optical response signal that comprises the response pulse, and fiber optic means for conveying one input pulse from the power splitter means to each sensor and for conveying output pulses from the sensors to the power combiner means such that each sensor has associated with it a delay time between the production of an input pulse by the power splitter means and the arrival of a resulting output pulse from that sensor at the power combiner means, the delay time associated with each sensor being greater by a fixed increment than the delay time associated with the adjacent sensor in a first direction along the line, the fixed increment being not substantially greater than the duration of each output pulse, whereby the response pulse has a time duration proportional to the number of sensors in the first substance.

5. The apparatus of claim 4, wherein the fixed increment is approximately equal to the duration of each output pulse.

6. The apparatus of claim 4, wherein the fiber optic means comprises a set of N first fiber optic cables for conveying the input pulses from the power splitter means to the respective N sensors, and a set of N second fiber optic cables for conveying the output pulses from the respective N sensors to the power combiner means, the total length of the first and second fiber optic cables associated with each sensor being adjusted to produce the delay time associated with that sensor.

7. The apparatus of claim 3, wherein the interface means includes junction means for dividing the source pulse into N input pulses and for combining output pulses into a single optical response signal that comprises the response pulse, and fiber optic means for conveying one input pulse from the junction means to each sensor and for conveying output pulses from the sensors to the junction means such that each sensor has associated with it a delay time between the production of an input pulse by the junction means and the arrival of a resulting output pulse from that sensor at the junction means, the delay time associated with each sensor being greater by a fixed increment than the delay time associated with the adjacent sensor in a first direction along the line, the fixed increment being not substantially greater than the duration of each output pulse, whereby the response pulse has a time duration proportional to the number of sensors in the first substance.

8. The apparatus of claim 7, wherein the fixed increment is approximately equal to the duration of each output pulse.

9. A method for determining the position of the boundary between first and second substances having different refractive indices, comprising:
positioning a plurality of N optical sensors along a line that intersects the boundary over a range of boundary positions, each sensor being adapted to receive an optical input pulse, and to produce a corresponding optical output pulse if the sensor is in the first substance and to produce no corresponding output pulse if the sensor is in the second substance;
generating an optical source pulse;
dividing the source pulse into N input pulses and conveying one input pulse to each sensor, whereby those sensors that are in the first substance will produce output pulses;
combining the output pulses into a response pulse such that the length of the response pulse is a function of the number of sensors that produce output pulses; and
measuring the duration of the response pulse.

10. The method of claim 9, wherein the second substance is a liquid in a container and the first substance is a gas above the surface of the liquid, and wherein the method comprises the further step of converting the measured duration of the response pulse into an indication of the level of liquid in the container.

11. The method of claim 9, wherein combining the output pulses into a response pulse comprises conveying the output pulses from the sensors to a combiner means and combining the output pulses at the combiner means.

12. The method of claim 11, further comprising causing delays in the arrival times of the output pulses at the combiner means such that each sensor has associated with it a delay time between the production of the input pulses from the source pulse and the arrival of a resulting output pulse from that sensor at the combiner means, the delay time associated with each sensor being greater by a fixed increment than the delay time associated with the adjacent sensor in a first direction along the line, the fixed increment being not substantially greater than the duration of each output pulse, whereby the response pulse has a time duration proportional to the number of sensors in the first substance.

13. The method of claim 12, wherein the fixed increment is approximately equal to the duration of each output pulse.

* * * * *